United States Patent
Wu et al.

(10) Patent No.: US 9,653,776 B2
(45) Date of Patent: May 16, 2017

(54) OUTDOOR WIRELESS ACCESS POINT AND ANTENNA ADJUSTING METHOD THEREOF

(75) Inventors: Szu-Cheng Wu, Hsinchu (TW); Tan-Chun Lu, New Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 1322 days.

(21) Appl. No.: 13/543,751

(22) Filed: Jul. 6, 2012

(65) Prior Publication Data

US 2013/0009819 A1    Jan. 10, 2013

(30) Foreign Application Priority Data

Jul. 8, 2011    (TW) .............................. 100124308 A

(51) Int. Cl.
| | |
|---|---|
| *H01Q 3/00* | (2006.01) |
| *H01Q 1/12* | (2006.01) |
| *H01Q 3/04* | (2006.01) |
| *H01Q 3/08* | (2006.01) |
| *H04B 7/08* | (2006.01) |

(52) U.S. Cl.
CPC ............. *H01Q 1/1257* (2013.01); *H01Q 3/04* (2013.01); *H01Q 3/08* (2013.01); *H04B 7/082* (2013.01); *H04B 7/0814* (2013.01)

(58) Field of Classification Search
CPC .......... H01Q 1/1257; H01Q 3/08; H01Q 3/04; H04B 7/082; H04B 7/0814
USPC ........................................... 342/359; 455/134
See application file for complete search history.

(56) References Cited

U.S. PATENT DOCUMENTS

| | | | | |
|---|---|---|---|---|
| 5,463,401 A | * | 10/1995 | Iwasaki ................ | H01Q 1/1257 342/359 |
| 5,903,237 A | * | 5/1999 | Crosby .................... | H01Q 3/02 342/359 |
| 5,923,288 A | * | 7/1999 | Pedlow, Jr. .......... | H01Q 1/1257 342/359 |
| 7,120,431 B1 | * | 10/2006 | Huo ....................... | H01Q 1/246 455/423 |
| 7,990,325 B2 | * | 8/2011 | Hunton .................... | H01Q 1/22 340/933 |
| 8,134,512 B1 | * | 3/2012 | Chen ..................... | H01Q 1/1257 342/359 |
| 8,223,073 B2 | * | 7/2012 | Berntsen ................ | H04B 7/086 342/432 |
| 8,559,886 B2 | * | 10/2013 | Zhao .................... | H01Q 1/1257 342/174 |
| 8,824,586 B2 | * | 9/2014 | Arad ....................... | G01R 29/08 375/267 |

(Continued)

*Primary Examiner* — Chuong P Nguyen
(74) *Attorney, Agent, or Firm* — Chun-Ming Shih

(57) ABSTRACT

An adjusting method of an antenna of the outdoor wireless access point includes steps of A. moving the antenna in a predetermined pointing range, and obtaining received signal strength indications in multiple pointing directions at different time points; B. separating the pointing range into at least two sub-ranges, and averaging the received signal strength indications in all pointing directions in each sub-range; and C. moving the antenna pointing at the sub-range in which the average received signal strength indication is the highest and setting the sub-range as the next predetermined pointing range, and repeating the steps A to C until the step C is executed a predetermined times. Besides, the composition elements of the outer wireless access point are also disclosed.

20 Claims, 4 Drawing Sheets

(56) References Cited

U.S. PATENT DOCUMENTS

| | | | |
|---|---|---|---|
| 9,322,898 B2* | 4/2016 | Kim | G01S 3/40 |
| 2008/0088518 A1* | 4/2008 | Charash | H01Q 1/1257 |
| | | | 343/757 |
| 2008/0248798 A1* | 10/2008 | Chung | H01Q 1/1257 |
| | | | 455/425 |
| 2013/0040655 A1* | 2/2013 | Keidar | H01Q 1/245 |
| | | | 455/456.1 |
| 2015/0102963 A1* | 4/2015 | Marshall | G01S 3/38 |
| | | | 342/449 |

* cited by examiner

| | |
|---|---|
| Step A | Moving the antenna in a predetermined pointing range, and obtaining the received signal strength indications in multiple pointing directions in the predetermined pointing range at different time points |

| | |
|---|---|
| Step B | Separating the pointing range into at least two sub-ranges, and averaging the received signal strength indications in all pointing directions in each sub-range |

| | |
|---|---|
| Step C | Moving the antenna pointing at the sub-range in which the average received signal strength indication is the highest and setting the sub-range as he next predetermined pointing range, and repeating the steps A to C until the step C is executed predetermined times |

FIG. 3

OUTDOOR WIRELESS ACCESS POINT AND ANTENNA ADJUSTING METHOD THEREOF

BACKGROUND

1. Technical Field

The present invention relates to a wireless signal transmitting device, particularly to an outdoor wireless access point and an antenna adjusting method thereof.

2. Related Art

When installing outdoor wireless access points, the worker usually first establishes a basic connection between of the wireless access points, and then manually adjust the pointing direction of the antenna of the near end wireless access point according to the received signal strength indication (RSSI) of the signals emitted from the far end wireless access point to obtain a better connection quality between the two wireless access points.

However, the foresaid method can be influenced by the worker's experience, which means the quality of the connection between the wireless access points can not be guaranteed. Besides, in the foresaid method, the antenna is adjusted according to the received signal strength in the environment when the wireless access point is installed. Since the received signal strength can be affected by the environmental factors (such as weather, unknown object interference, signal interference, or any other interference sources), the adjustment of the antenna may only be a better configuration at that moment but not a best configuration for all the time. Furthermore, the changing of the environmental factors often influences the connection quality, and the signal interruption or low data transfer performance may be caused due to unable to timely adjust the antenna to a better pointing direction, so that the antenna has to be manually adjusted frequently, and the adjusting task also takes extra labors and time.

BRIEF SUMMARY

The present invention provides an adjusting method for an antenna of an outdoor wireless access point, and the pointing direction of the antenna can be auto adjusted to obtain a better received signal strength for the outdoor access point.

The outdoor wireless access point of the present invention includes an antenna, a driving device, and a processor. The driving device connects the antenna, and the driving device further includes a motor and a controlling circuit. The motor is used to move the antenna and the controlling circuit controls the operation of the motor. The processor electrically connects the antenna to emit wireless signals or receive the wireless signals emitted from another wireless access points, and the processor can also calculate the received signal strength indication at each pointing direction of the antenna, thereby sending controlling signals to the controlling circuit to control the motor to move antenna pointing at a direction in which the received signal strength indication is the highest.

The present invention also provides an adjusting method of an antenna of the outdoor wireless access point including steps of A. moving the antenna in a predetermined pointing range, and obtaining received signal strength indications in multiple pointing directions at different time points; B. separating the pointing range into at least two sub-ranges, and averaging the received signal strength indications in all pointing directions in each sub-range; and C. moving the antenna pointing at the sub-range in which the average received signal strength indication is the highest and setting the sub-range as the next predetermined pointing range, and repeating the steps A to C until the step C is executed a predetermined times.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is a flowchart of the adjusting method according to the present invention.

DETAILED DESCRIPTION

Figure 1:
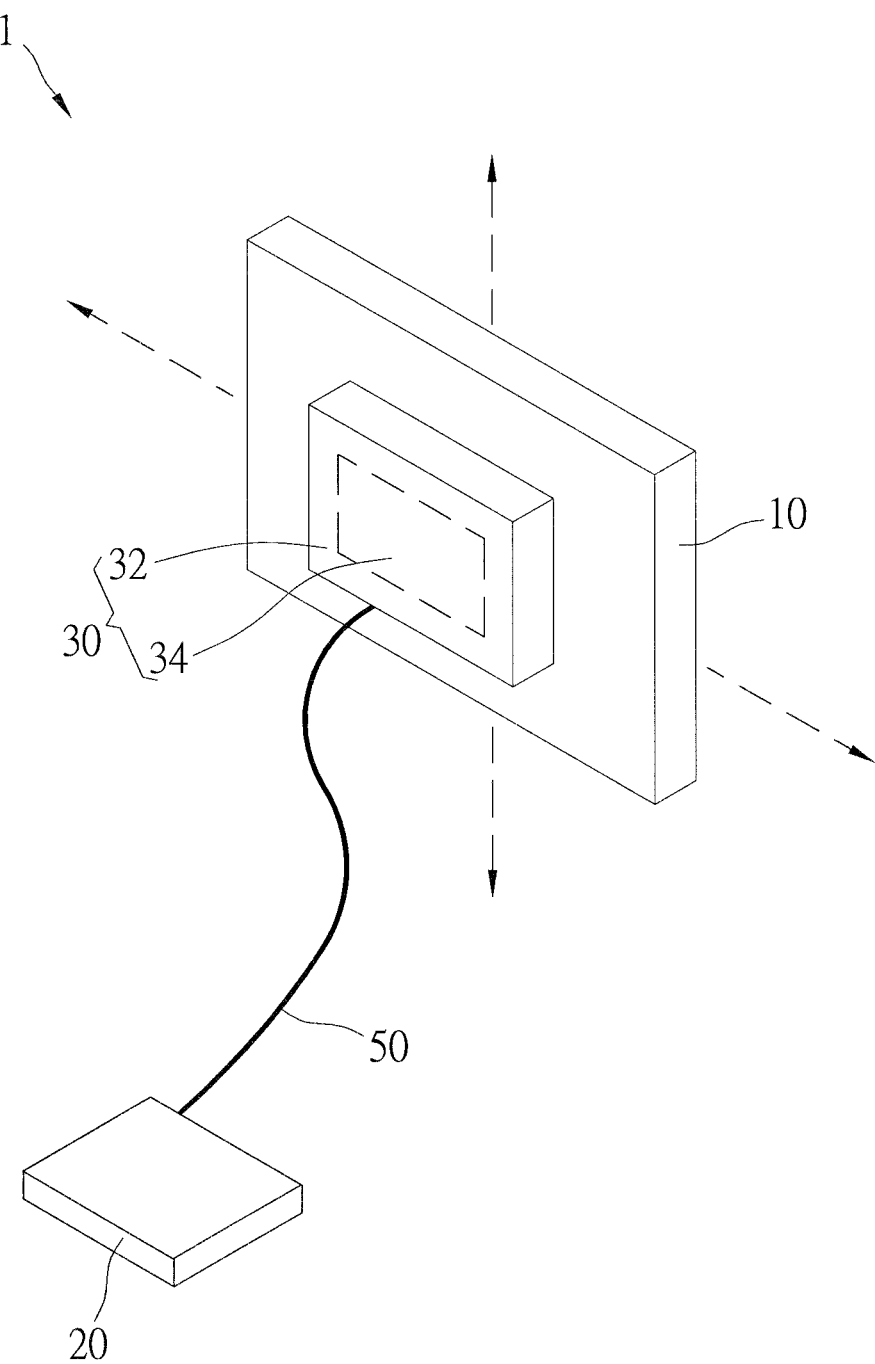
FIG. 1 is a schematic diagram of the outdoor wireless access point according to the present invention.

Please refer to FIG. 1, the outdoor wireless access point 1 according to the present invention includes an antenna 10, a processor 20, and a driving device 30, wherein the processor 20 electrically connects the antenna 10 to emit or receive the wireless signal via the antenna 10 and obtains the received signal strength indication. The processor 20 can be a digital signal processor, a micro-controller, a central processing unit, a processor able to apply the aforementioned functions, or a circuit designed to apply the aforementioned functions, such as a complex programmable logic device, filed programmable gate array, etc., but not limited thereto.

The driving device 30 connects the antenna 10 and further includes a motor 32 and a controlling circuit 34. The motor 32 drives the antenna to swing, and the controlling circuit 34 electrically connects the processor 20 via a transmission line 50 to control the operation of the motor 32. In the present embodiment, the controlling circuit electrically connects the processor 20 via a RS232 cable, but not limited thereto. The transmission line 50 can also be substituted as demand to an Ethernet cable, a radiofrequency cable, or any other cables capable of transferring signal.

Figure 2:
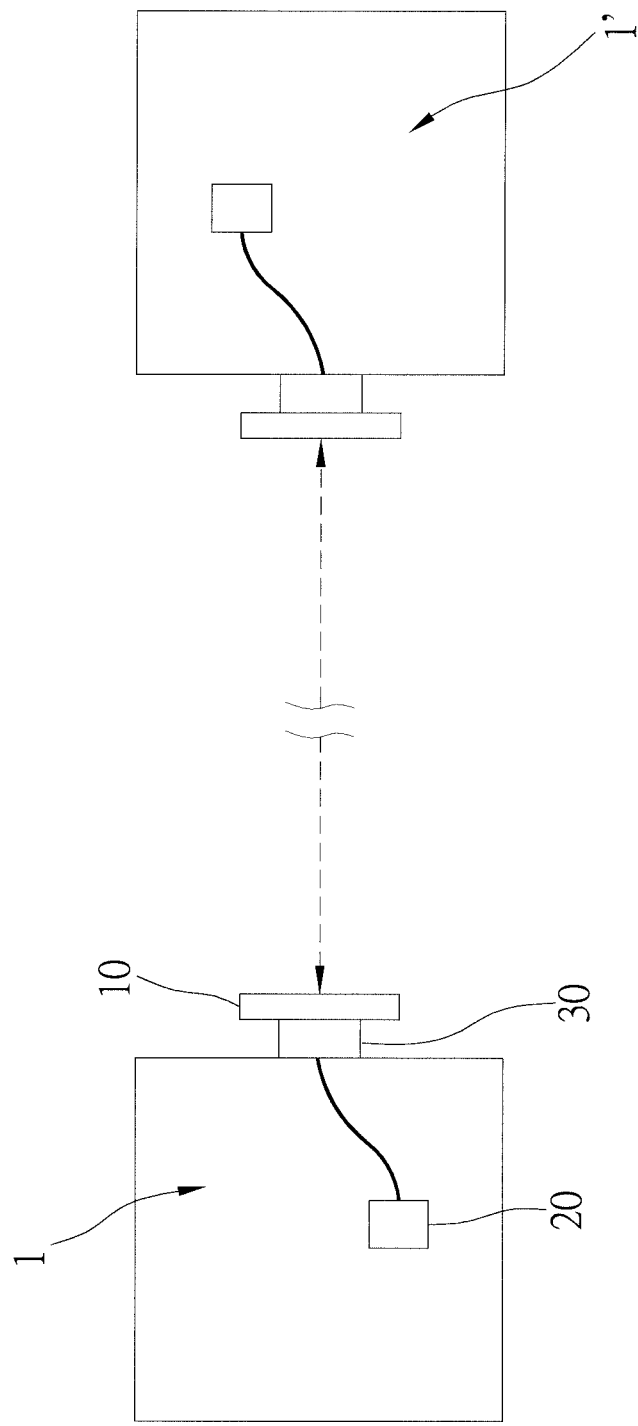
FIG. 2 is a wireless connecting diagram of two outdoor wireless access points.
Figure 4:
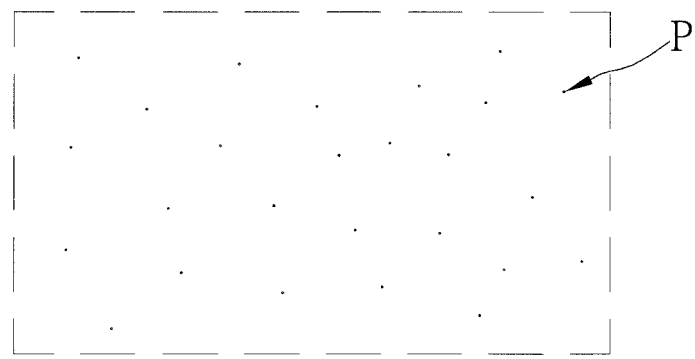
FIGS. 4-6 are schematic diagrams of the steps of the adjusting method according to the present invention.

Please refer to FIG. 2, after the outdoor wireless access point 1 is installed and wirelessly connects to another outdoor wireless access point 1', a auto adjusting method for the antenna 10 can be executed, which allows the outdoor wireless access point 1 to obtain a better received signal strength when connecting to another wireless access points. Please refer to FIG. 3, and the auto adjusting method includes the following steps:

A. Moving the antenna 10 in a predetermined pointing range, and obtaining the received signal strength indications in multiple pointing directions in the predetermined pointing range at different time points (as shown in FIG. 4). In the present embodiment, the received signal strength indications are obtained in multiple random directions at different time points, but not limited thereto.

Figure 5:
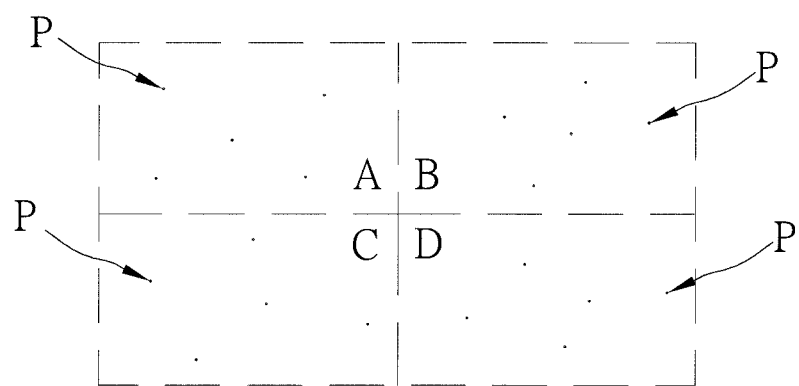

B. Separating the pointing range into at least two sub-ranges, and averaging the received signal strength indications in all pointing directions in each sub-range. For example, calculating and obtaining the sum of the received signal strength indications in all directions in each sub-range, and then dividing the sum with the number of the pointing directions in each sub-range, thereby obtaining the average received signal strength indication in each sub-range. In the present embodiment, the pointing range is separated into four sub-ranges A-D (as shown in FIG. 5), but not limited thereto. The number of the sub-range can be two, three, or other amount of sub-range as demand.

Figure 6:
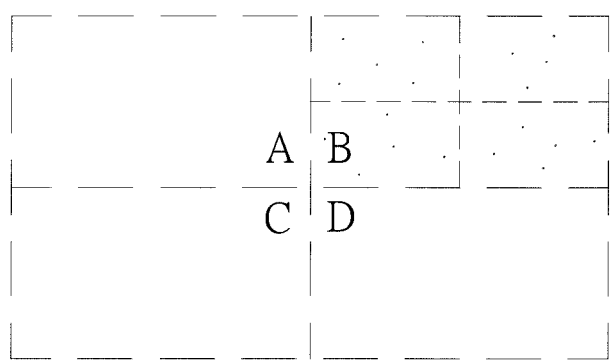

C. Moving the antenna pointing at the sub-range in which the average received signal strength indication is the highest and setting the sub-range as he next predetermined pointing range, and repeating the steps A to C (as shown in FIG. 6) until the step C is executed predetermined times. In the present embodiment, when executing the step C, the center of the antenna 10 is moved to point the center of the sub-range in which the average received signal strength indication is the highest. When the step C is executed predetermined times (for example, 5 times), stop executing step C. The executing times of step C may increase or decrease as demand. Thus, after executing the step C, the antenna 10 can point at the smallest sub-range in which the average received signal strength indication is the highest, thereby placing the outdoor wireless access point 1 in a condition of having the best received signal strength indications.

In the present embodiment, the averaging received signal strength indication is executed by the processor 20, and the processor 20 sends controlling signals to the controlling circuit 34 controlling the motor 32 moving the antenna to point at the sub-range in which the average received signal strength indication is the highest.

Besides, the aforementioned pointing range means the range in which the antenna 10 can swing, For example, the range of swing angle (up and down, left and right) of the antenna 10. In practice, when first executing the step A, the swing angle of the antenna 10 can be restricted in like 20 degrees in horizontal and vertical, and the range between 10 degrees upward to 10 degrees leftward is determined as sub-range A, and the range between 10 degrees upward to 10 degrees rightward is determined as sub-range B. When executing the step C, the swing angle of the antenna 10 is reduced to 10 degrees after the antenna 10 pointing at the sub-range in which the average received signal strength indication is the highest, and thereby reduces the pointing range of the antenna 10. By doing so, the range for wireless signal detection can be reduced gradually.

As mentioned above, the received signal strength indications can be obtained in multiple pointing directions which are randomly sampled. Besides, the multiple pointing directions can also be sampled according to a predetermined rule. For example, in step A, the predetermined pointing range can be separated into at least two sampling range, and a predetermined numbers of received signal strength indications can be obtained in predetermined pointing directions in each sampling range at different time points. In step B, the pointing range is separated into at least two sub-ranges according to the sampling ranges. Furthermore, in order to obtain a more precise average received signal strength indication in step B, the numbers of received signal strength indications obtained in the sampling ranges in step A can be equal.

In the embodiment of the present invention, the outdoor wireless access point 1' receives the wireless signals sent by the outdoor wireless access point 1, and then sends packages having the received signal strength indications back to the outdoor wireless access point 1, therefore, the antenna of the outdoor wireless access point 1 can be adjusted according to the received signal strength indications. Thus, the uploading communication quality can be guaranteed for the outdoor wireless access point which demands more upload flows (such as the outdoor wireless access point used for wireless monitor, wireless video camera, etc).

On the contrary, in the place where the outdoor wireless access point 1 demands more download flows, the antenna of the outdoor wireless access point 1 can also be adjusted according to the received signal strength when receiving signals from the outdoor wireless access point 1'. Similarly, in the place where demands both upload and download flows, the antenna of the outdoor wireless access point 1 can be adjusted according to the sum of the received signal strength when the outdoor wireless access point 1 is receiving signals from the outdoor wireless access point 1', and the received signal strength when the outdoor wireless access point 1' is receiving signals from the outdoor wireless access point 1.

It is noteworthy that, the auto adjusting method for the antenna of the outdoor wireless access point 1 according to the present invention can be automatically re-executed (which means executing the steps A to C until the C has been executed a predetermined times) at specific times after the adjustment of the outdoor wireless access point 1 has been completed at installing. The outdoor wireless access point 1 can also be set to auto re-execute the aforementioned method when the received signal strength indication is lower than a predetermined signal strength, thereby keeping the received signal strength indication of the outdoor wireless access point 1 in a better signal intensity.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An adjusting method of an antenna of an outdoor wireless access point, being executed when the outdoor wireless access point connects a remote outdoor wireless access point, the method comprising steps of:
   A. moving the antenna in a predetermined pointing range by a driving device to point at multiple pointing directions in the predetermined pointing range, and obtaining received signal strength indications in the multiple pointing directions at different time points by a processor;
   B. separating the predetermined pointing range into at least two sub-ranges, and averaging the received signal strength indications in all pointing directions in each sub-range by the processor, and
   C. moving the antenna to point at the sub-range in which the average received signal strength indication is the highest by the driving device, and setting the sub-range as the next predetermined pointing range;
   wherein the steps A to C are repeated until the step C is executed a predetermined number of times.

2. The adjusting method according to claim 1, wherein the received signal strength indications in the step A are obtained from the packets sent by the remote outdoor wireless access point when the remote outdoor wireless access point is receiving signals sent by the outdoor wireless access point.

3. The adjusting method according to claim 1, wherein the received signal strength indications in the step A are the sum of the received signal strength when the outdoor wireless access point is receiving signals from the remote outdoor wireless access point, and the received signal strength when the remote outdoor wireless access point is receiving signals from the outdoor wireless access point.

4. The adjusting method according to claim 1, wherein the multiple pointing directions in step A are randomly sampled.

5. The adjusting method according to claim 1, wherein the multiple pointing directions in step A are sampled according to a predetermined rule.

6. The adjusting method according to claim 5, wherein, in step A, the predetermined rule is separating the predetermined pointing range into at least two sampling ranges, and sampling, multiple pointing directions in sampling range at different time points; in the step B the at least two sub-ranges, are the sampling ranges.

7. The adjusting method according to claim 6, wherein the numbers of the obtaining received signal strength indications obtained in the sampling ranges in step A are equal.

8. The adjusting method according to wherein moving the antenna in a predetermined pointing range in the step A is swinging the antenna in a restricted vertical awing angle and a restricted horizontal swing angle.

9. The adjusting method according to claim 8, wherein the restricted swing angles are reduced with a predetermined ratio during each repeating the steps A to C.

10. The adjusting method according to claim 1, wherein moving the antenna to point at the sub-range in the step C is moving a center of the antenna to point to a center of the sub-range.

11. The adjusting method according to claim 1, wherein averaging the received signal strength indications in step B is dividing a sum of the received signal strength indications in all the pointing directions in each sub-range with a number of the pointing directions in each sub-range.

12. The adjusting method according to claim 1, further comprising step of re-executing the steps A to C when the received signal strength indications of the outdoor wireless access point is lower than a predetermined received signal strength indication.

13. The adjusting method according to claim 1, further comprising step of re-executing the steps A to C after a predetermined period.

14. An outdoor wireless access point, comprising:
an antenna:
a driving device connecting to the antenna, the driving device comprising a motor and a controlling circuit, the motor is configured for driving the antenna to move, the controlling circuit controlling an operation of the motor; and
a processor electrically connecting to the antenna to emit or receive wireless signals via the antenna, the processor calculating obtained received signal strength indications when the antenna moving to point at different pointing directions in a predetermined pointing range, and sending signals to the controlling circuit to drive the motor to move the antenna to point at the pointing directions to obtain the received signal strength indications;
wherein the predetermined pointing range is separated into at least two sub-ranges, and the processor is configured for setting one of the at least two sub-ranges as the next predetermined pointing range.

15. The outdoor wireless access point according to claim 14, wherein the controlling circuit electrically connect the processor via a RS232 cable, an Ethernet cable, or a radiofrequency cable.

16. The outdoor wireless access point according to claim 14, wherein the controlling circuit controls the motor to restrict a swing angle of the antenna, so that the antenna moves in a predetermined pointing range.

17. The outdoor wireless access point according to claim 14, wherein the received signal strength indications are obtained from the packets sent by a remote outdoor wireless access point when the remote outdoor wireless access point is receiving signals sent by the outdoor wireless access point.

18. The outdoor wireless access point according to claim 14, wherein the received signal strength indications are the sum of the received signal strength when the outdoor wireless access point is receiving signals from a remote outdoor wireless access point, and the received signal strength when the remote outdoor wireless access point is receiving signals from the outdoor wireless access point.

19. The outdoor wireless access point according to claim 14, wherein the processor sends the signals to the controlling circuit to drive the motor to move the antenna pointing at the pointing directions in the predetermined pointing range to obtain the received signal strength indications when the received signal strength indication calculated by the processor is lower than a predetermined signal strength.

20. The outdoor wireless access point according to claim 14, wherein the processor sends a signal to the controlling circuit to drive the motor to move the antenna pointing at the pointing directions in the predetermined pointing range to obtain the received signal strength indications after a predetermined period.

* * * * *